United States Patent
Wang et al.

(10) Patent No.: US 8,819,151 B2
(45) Date of Patent: *Aug. 26, 2014

(54) METHOD FOR PROCESSING DEFERRED MESSAGE

(75) Inventors: Jue Wang, Guangdong (CN); Lunjian Mu, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 263 days.

This patent is subject to a terminal disclaimer.

(21) Appl. No.: 13/190,256

(22) Filed: Jul. 25, 2011

(65) Prior Publication Data

US 2011/0282957 A1 Nov. 17, 2011

Related U.S. Application Data

(63) Continuation of application No. 11/548,384, filed on Oct. 11, 2006, now Pat. No. 8,010,611.

(30) Foreign Application Priority Data

Oct. 11, 2005 (CN) .......................... 2005 1 0112565

(51) Int. Cl.
*G06F 15/16* (2006.01)

(52) U.S. Cl.
USPC ........ 709/206; 455/412.2; 455/466; 709/207; 709/218; 709/219; 709/230

(58) Field of Classification Search
USPC .................. 348/14.01–14.16; 370/259–271, 370/351–356; 379/67.1–88.28; 455/412.1–426.2, 456.1–466, 455/550.1–560, 575.1–575.9, 90.1–90.3; 709/201–207, 217–248
See application file for complete search history.

(56) References Cited

U.S. PATENT DOCUMENTS 7,305,069 B1 12/2007 Day
7,529,813 B2 5/2009 Lim et al.
(Continued)

FOREIGN PATENT DOCUMENTS

CN 1404288 3/2003
CN 1509577 A 6/2004
(Continued)

OTHER PUBLICATIONS

"OMA-TS-IM_SIMPLE, Draft Version 0.2", Open Mobile Alliance, Jun. 23, 2005, 34 pages.
(Continued)

*Primary Examiner* — Hemant Patel

(57) ABSTRACT

A method for processing deferred messages includes a storing process, a notification process and a retrieving process of a deferred message. In the storing process, when a user presets and requires to store the deferred message, the system stores the deferred message to be sent to the user; in the notification process, when a user gets online, an IM server at the client side detects the system has stored the deferred message for the user and if the user has subscribed the deferred message notification, the system sends the deferred message notification to the client according to the setting of the system or of the user; in the retrieving process, when the client receives the deferred message notification and requests to acquire the deferred message, its IM server sends the deferred message content to the client. The present invention improves the method for processing deferred messages in the SIP/SIMPLE IM service system.

8 Claims, 8 Drawing Sheets

(56) References Cited

U.S. PATENT DOCUMENTS

| | | | |
|---|---|---|---|
| 7,561,595 | B2 | 7/2009 | Garcia-Martin et al. |
| 7,580,719 | B2 | 8/2009 | Karmarkar |
| 7,725,098 | B1 | 5/2010 | Claudatos et al. |
| 8,010,611 | B2 * | 8/2011 | Wang et al. .......... 709/206 |
| 8,296,384 | B2 * | 10/2012 | Pattan et al. .......... 709/207 |
| 2002/0131395 | A1 | 9/2002 | Wang |
| 2004/0109439 | A1 | 6/2004 | Kiss et al. |
| 2004/0152477 | A1 | 8/2004 | Wu et al. |
| 2005/0170861 | A1 | 8/2005 | Niemi et al. |
| 2006/0004914 | A1 | 1/2006 | Kelly et al. |
| 2007/0067324 | A1 | 3/2007 | Burkhardt |
| 2007/0076751 | A1 | 4/2007 | Garcia-Martin et al. |
| 2007/0078935 | A1 | 4/2007 | Garcia-Martin et al. |
| 2007/0226295 | A1 | 9/2007 | Haruna et al. |
| 2008/0059579 | A1 | 3/2008 | Maes |
| 2008/0113679 | A1 | 5/2008 | Sung et al. |
| 2009/0125803 | A1 | 5/2009 | Bao et al. |
| 2009/0129388 | A1 | 5/2009 | Akhtar et al. |
| 2009/0249348 | A1 | 10/2009 | Xu et al. |
| 2009/0279455 | A1 | 11/2009 | Wang et al. |
| 2009/0282118 | A1 | 11/2009 | Garcia-Martin et al. |
| 2010/0197329 | A1 | 8/2010 | Claudatos et al. |
| 2010/0235762 | A1 | 9/2010 | Laiho et al. |
| 2010/0255865 | A1 | 10/2010 | Karmarkar |
| 2010/0325221 | A1 | 12/2010 | Cohen et al. |
| 2011/0014933 | A1 | 1/2011 | Karmarkar et al. |
| 2011/0035442 | A1 | 2/2011 | Hjelm et al. |

FOREIGN PATENT DOCUMENTS

| | | |
|---|---|---|
| CN | 1642148 | 7/2005 |
| CN | 1663216 A | 8/2005 |
| EP | 05008496.1 | 4/2005 |
| WO | WO 03/107621 A1 | 12/2003 |
| WO | WO 2005/046192 A1 | 5/2005 |

OTHER PUBLICATIONS

"Instant Messaging using SIMPLE Architecture", Draft Version 1.0.0, Open Mobile Alliance, Aug. 19, 2005, 29 pages.

International Search Report dated Nov. 9, 2006 in connection with International Patent Application No. PCT/CN2006/001600.

Written Opinion of the International Searching Authority dated Nov. 9, 2006 in connection with International Patent Application No. PCT/CN2006/001600.

* cited by examiner

METHOD FOR PROCESSING DEFERRED MESSAGE

CROSS-REFERENCE TO RELATED APPLICATIONS

This application is a continuation of U.S. patent application Ser. No. 11/548,384, filed on Oct. 11, 2006, which claims priority to Chinese Patent Application No. 200510112565.X, filed on Oct. 11, 2005. The afore-mentioned patent applications are hereby incorporated by reference in their entireties.

TECHNICAL FIELD

The present invention relates generally to communication techniques, and more particularly to a method for processing deferred messages in an instant message system under Session Initiated Protocol (SIP)/Instant Message and Presence Leveraging Extensions (SIMPLE) protocol.

BACKGROUND

The instant message (IM) service is a kind of person-to-person or person-to-group message-type mobile data service based on the Presence and can be applied to mobile communication networks and the Internet. The mobile communication networks include current 2G network, 2.5 G network, future 3G network, IP Multimedia Subsystem (IMS) and the like.

Generally, there are two types of IM systems in the current industrial specifications. One is Wireless Village (WV) based, which is carried on Hyper Text Transport Protocol (HTTP)/Wireless Access Protocol (WAP)/Short Message Service Protocol (SMS) and supports 2.5G/3G network, and the other is SIP/SIMPLE based, which is carried on SIP/SIMPLE and supports IMS-based IP network.

In the IM system based on SIP/SIMPLE, there exists such a scene desired that when a sender sends an instant message to a receiver who is offline, the IM server of the receiver selects whether it is necessary to store the deferred message according to user configuration and system configuration (i.e., whether the deferred message needs to be stored and retrieved and whether the function for supporting deferred message is provided, etc.). If the deferred message is stored, when the receiver registers to the SIP/IP core network once again and logs in the server of the receiver, the IM server can show the receiver a deferred message notification and if the receiver would like to obtain the details of one or more messages, the receiver may send a retrieving request to the server and then the server will issue the details of the selected messages to the receiver.

SUMMARY

The present invention provides a method for processing deferred messages, which is applicable in an instant message (IM) system under Session Initiated Protocol (SIP)/Instant Message and Presence Leveraging Extensions (SIMPLE). The method of the present invention includes storing the deferred messages, notifying of the deferred messages and retrieving the deferred messages. Particularly, the step of storing the deferred messages includes storing, by the IM system, the deferred messages to be sent to a user in a case that the user pre-requests for storing the deferred messages. The step of notifying of the deferred messages includes determining there are deferred messages for the user stored in the IM system by an IM server associated with a client of the user when the user gets online, and sending a deferred message notification to the client of the user under subscribed configuration in a case that the user subscribes the deferred message notification, or otherwise, sending the deferred message notification to the client under default setting of the IM system. And the step of retrieving the deferred messages includes sending the deferred messages to the client by the IM server by request from the client for retrieving the deferred messages after receiving the deferred message notification.

According to the present invention, the deferred messages include meta-data and content, said meta-data and said content combined and stored in a single storage entity or stored separately in different storage entities in step of storing the deferred messages.

According to the present invention, if the meta-data and the content of the deferred messages are stored in different storage entities, the meta-data is stored in an IM Extensible Markup Language Document Management Server entity (IM XDMS entity) and the content is stored in a deferred message content storage entity.

According to the present invention, that the user subscribes the deferred message notification further includes the client of the user initiating a SIP SUBSCRIBE request message for subscribing the deferred message notification to the respective IM server; said respective IM server authenticating the user and if the user is authenticated, the IM server sending a SIP NOTIFY message to the client of the user, said SIP NOTIFY message including a current deferred message status and the deferred message notification for the user.

According to the present invention, the SIP SUBSCRIBE request message includes a subscription event package, in which a deferred message notification content is set.

According to the present invention, the deferred message notification content includes deferred message list information and deferred message meta-data.

According to the present invention, the SIP SUBSCRIBE request message includes a deferred message notification time.

According to the present invention, the deferred message notification time includes sending the deferred message notification each time the client gets online during a specified period or sending the deferred message notification once only after subscription.

According to the present invention, if the user subscribes the deferred message notification, the respective IM server sends the deferred message notification in a SIP NOTIFY message; otherwise, the respective IM server sends the deferred message notification in a SIP MESSAGE under default setting of the IM system.

According to the present invention, the IM server sending the deferred message notification in a SIP MESSAGE under default setting of the IM system includes the IM system sending the deferred message notification at a set time or periodically or once only after the client gets online.

According to the present invention, the deferred message notification content includes deferred message list information and deferred message meta-data or a deferred message content.

According to the present invention, if the meta-data and the content are combined and stored in a single storage entity and the user subscribes the deferred message notification, when the client of the user gets online, the IM server queries and retrieves the meta-data for the user from the storage entity through a database interface; and then the IM server constructs a deferred message list in accordance with a query result and sends the deferred message notification to the client of the server by a SIP NOTIFY message carrying the deferred message list and the deferred message meta-data.

According to the present invention, if the meta-data and the content are combined and stored in a single storage entity but the user does not subscribe the deferred message notification, when the client of the user gets online, the IM server queries and retrieves the meta-data for the user from the storage entity through a database interface under default setting of the system; and then the IM server constructs a deferred message list in accordance with a query result and sends the deferred message notification to the client of the server by a SIP MESSAGE carrying the deferred message list and the deferred message meta-data.

According to the present invention, if the deferred message meta-data is stored in an IM XDMS entity and the user subscribes the deferred message notification, when the client of the user gets online, the IM server queries and retrieves the deferred message meta-data for the user from the IM XDMS entity through an IM-3 interface; and then the IM server constructs a deferred message list in accordance with a query result and sends the deferred message notification to the client of the server by a SIP NOTIFY message carrying the deferred message list and the deferred message meta-data.

According to the present invention, if the deferred message meta-data is stored in an IM XDMS entity and the user does not subscribe the deferred message notification, when the client of the user gets online, the IM server queries and retrieves the deferred message meta-data for the user from the IM XDMS entity through an IM-3 interface; and then the IM server constructs a deferred message list in accordance with a query result and sends the deferred message notification to the client of the server by a SIP MESSAGE carrying the deferred message list and the deferred message meta-data.

According to the present invention, after the client of the user receives the deferred message notification, the client initiates a deferred message retrieving request which carries an retrieving condition.

According to the present invention, the client of the user initiates the deferred message retrieving request through a SIP message, an HTTP message or an Message Session Relay Protocol (MSRP) message in an MSRP channel.

According to the present invention, the retrieving condition includes selecting the deferred messages according to a sender, a sending time, or a subject of the messages or a combination thereof or selecting the deferred messages randomly.

According to the present invention, after the IM server receives the deferred message retrieving request, the IM server sends the deferred message content to the client of the user under the retrieving condition.

According to the present invention, the IM server sends the deferred message content through a SIP message, an HTTP message or an MSRP message in an MSRP channel.

According to the present invention, the IM server incorporates one deferred message content in one sending message; or combines a plurality of deferred message contents in one sending message to send.

According to the present invention, the plurality of deferred message contents includes bytes less than or equal to a maximum bytes supported by the sending message.

According to the present invention, if the meta-data and the content of the deferred message are combined and stored in a single storage entity, the IM server queries and retrieves the deferred message content for the user from the deferred message storage entity through a database interface and then sends the deferred message content; if the meta-data and the content of the deferred message are stored in different storage entities, the IM server queries and retrieves the deferred message content for the user from the storage entity which stores the deferred message content through a database interface and then sends the deferred message content.

According to the present invention, if the MSRP message is adopted to send the deferred message content, send the deferred message content by an existing or a newly established MSRP channel between the IM server and the client of the user.

According to the present invention, sending the deferred message content by a newly established MSRP includes the IM server retrieving the deferred message content for the user and then establishing a new MSRP channel for sending the deferred message content; or after receiving the retrieving request for the deferred message from the client of the user, the IM server establishing an MSRP channel with the client of the user and then retrieving and sending the deferred message content for the user.

According to the present invention, the step of retrieving the deferred message content for the user and then establishing a new MSRP channel for sending the deferred message content further includes after receiving the retrieving request for the deferred message from the client of the user, the IM server querying the deferred message content under the retrieving condition carried in the request and storing the deferred message content locally; the IM server sending a SIP request message to the client of the user and requesting to establish an MSRP channel with the client of the user; the client of the user returning a SIP response message to the IM server; after receiving the SIP response message, the IM server sending a SIP acknowledge message to the client of the user, establishing an MSRP channel with the client of the user and sending the retrieved deferred messages to the client of the user through the MSRP channel.

According to the present invention, when all the deferred messages are sent, the IM server sends a SIP BYE message to the client of the server; and the client of the server returns a response message.

According to the present invention, the step of establishing an MSRP channel with the client of the user and then retrieving and sending the deferred message content for the user further includes after receiving the retrieving request for the deferred message from the client of the user, the IM server sending a SIP request message and requesting to establish an MSRP channel with the client of the user; the client of the user returning a SIP response message to the IM server; after receiving the SIP response message, the IM server sending a SIP acknowledge message to the client of the user, establishing an MSRP channel with the client of the user; the IM server querying the deferred message content under the retrieving condition carried in the retrieving request for the deferred message and sending the deferred message content to the client of the user through the established MSRP channel.

According to the present invention, when all the deferred messages are sent, the IM server sends a SIP BYE message to the client of the server; and the client of the server returns a response message.

According to the present invention, if the user does not pre-request for storing the deferred messages, when the IM system receives the deferred messages for the user, the system abandons the deferred messages; or processes the deferred messages under default strategy of the IM system.

According to the present invention, in the step of retrieving the deferred messages, the IM server sends the deferred messages to the client of the user and the client of the user sends a response message to it's the respective IM server.

According to the present invention, after receiving the response message from the client of the user, the respective IM server deletes the deferred messages stored in the storage entity that are sent.

According to the present invention, after the IM server retrieves the deferred message content for the client of the user from the storage entity, delete the retrieved messages from the storage entity.

According to the present invention, after the IM server retrieves the deferred message content for the client of the user from the storage entity, mark the retrieved messages and delete all the marked deferred messages at set time.

According to the present invention, after the IM server retrieves the deferred message content for the client of the user from the storage entity, set a storage time limit for the retrieved deferred messages in the storage entity, and when storing time of the deferred messages in the system expires by the time limit, delete the deferred messages from the storage entity.

The present invention flexibly supports an SIP/SIMPLE IM user to select the deferred message notifying manner, the notification content, the time to obtain the deferred message and the content of the specific deferred message according to requirement, so that the SIP/SIMPLE IM system can completely support a complete solution for processing deferred message and provide abundant service experiences for the user. In addition, since the meta-data and the content of the deferred message are stored in an IM XDMS entity and a storage entity respectively, it enables to retrieve the relating data much more conveniently and supports XML Configuration Access Protocol (XCAP). Further, the deferred messages that have been sent will be deleted from the system so as to save the system resource.

DETAILED DESCRIPTION

Figure 1:
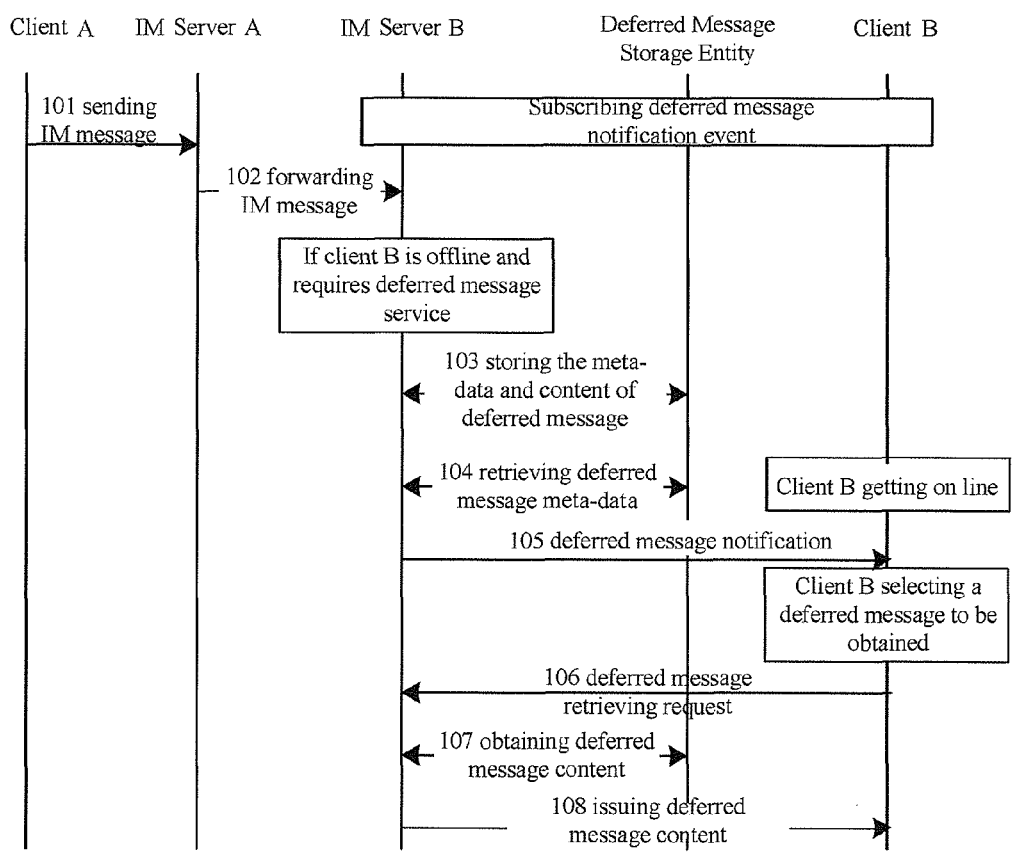
FIG. 1 is a flow chart showing the process of storing, notifying and retrieving deferred messages according to an embodiment of the present invention.

The process of the present invention will be first described from a service application aspect. As shown in FIG. 1, client A is a client of a user sending an instant message; IM server A is a server for the client A; client B is a client of the user receiving an instant message; IM server B is a server for the client B; a deferred message storage entity stores the instant message sent from the client A when the client B is off line. Detailed process is as follows.

101. User A desires to send an instant message to the user B and will first send the instant message to the IM server A in the domain thereof.

102. The IM server A judges the user B belongs to the IM server B and sends the instant message to the IM server B.

103. The IM server B determines whether the user B is online, if yes, send the instant message to the user B and the process ends; otherwise, the IM server B determines whether the user B configures to require the deferred message service, if yes, the IM server stores the message content and meta-data (such as sending time, sender, receiver and subject) in the deferred message storage entity.

104. When the user B gets online, the IM server B retrieves the deferred message meta-data stored in the deferred message storage entity.

105. The IM server B issues the deferred message notification to the client B, including the deferred message list and the meta-data.

106. The user B may choose to retrieve one or some of the messages and send a deferred message retrieving request to the IM server B.

107. The IM server B reads the specific deferred message content for the client B from the deferred message storage entity.

108. The IM server B issues the deferred message content to the user and may issue the messages one by one or issue a plurality of messages at one time.

In the above process, step of the client B subscribing the deferred message notification from the IM server B is optional. The client B may subscribe the deferred message notification from the IM server B at any time after the IM service is available, or may temporarily subscribe the deferred message notification from the IM server B after getting online. If the client B does not subscribe at all, the IM server may provide the deferred message notification function complying with default setting of the system (strategy of the operator) or may not provide this function.

In the process of subscribing the deferred message notification, the client may choose the notifying manner of the deferred message such as notifying each time the user gets online or notifying only once for this subscription. The client may also choose the notification content such as only including the deferred message list and the deferred message meta-data or choose to directly issue the deferred message content. If the chosen notification content includes the deferred message list and the deferred message meta-data, there will be the proceeding process such as the retrieving request, and issue of the deferred message content. If directly issuing the content is chosen, there will be no subsequent process such as the retrieving request, and issue of the deferred message content (the present invention mainly aims at the case that the notification content includes the deferred message list and the deferred message meta-data).

The user may subscribe the deferred message notification for a long term in advance or subscribe only once after the user gets online. These two subscription flows will be described respectively.

According to the embodiment of the present invention, after retrieving the deferred message content from the deferred message storage entity, the IM server can delete or mark the retrieved deferred message from the deferred message storage entity so as to distinguish which are retrieved and which are not retrieved and then the IM system will delete all the retrieved deferred messages at a preset time. Of course, the IM server may delete the deferred messages according to the requirement subscribed by the client, for example, when the IM server receives the response from the client B after the client B receives the deferred message, it will delete the deferred message stored in the deferred message storage entity (deleting immediately or after a period). It may set a corresponding expiration time in the deferred message and when the storage time of the deferred message expires by the time, the deferred message will be deleted from the deferred message storage entity. The above process of deleting the deferred message is a preferred method in the embodiment of the present invention and of course other methods are also feasible according to the subscription requirement of the IM system or of the client.

Figure 2:
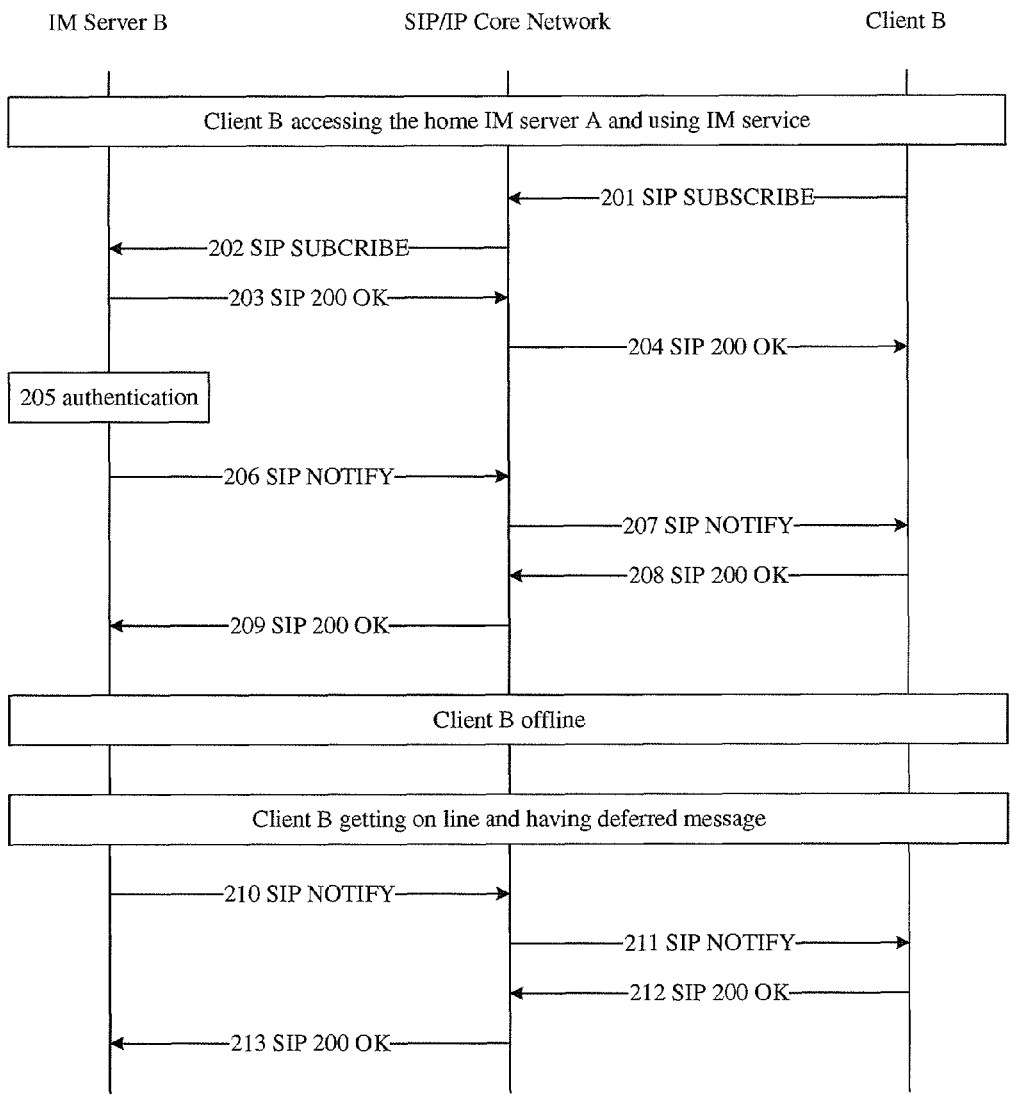
FIG. 2 is a signaling flow chart showing the process that a client of a user receiving the deferred message pre-requests to subscribe a deferred message notification from a server and a notification issues according to an embodiment of the present invention.

FIG. 2 shows a process of a client of the user subscribing the deferred message notification at any time after the IM service is available.

Client B is a client of the user receiving a deferred message; IM server B is a server for the client B; a SIP/IP core network represents the SIP core network of the client B.

The specific flow is as follows.

201. The client of the receiving user sends a SIP SUBSCRIBE request to the SIP/IP core network to subscribe the deferred message notification. The SIP URI address of the IM server B is put in the Request URI to show intension to subscribe the event of the IM server B. The time of retrieving the update information notification can be defined in the header of the event package of the message such as defining the user may retrieve the deferred message notification each time he gets online. The notification content may be specified in the message event package such as including the deferred message list and the deferred message meta-data or including the deferred message content. The feature code of the SIP/SIMPLE IM service may be included in the Accept-Contact (name of a standard field in the SIP message header) of the message such as "+g.oma.sip-im".

202. The SIP/IP core network judges the subscription request is for the IM server B according to the URI address and forwards the SIP SUBSCRIBE request to the IM server B.

203. After receiving the SIP SUBSCRIBE request, the IM server B returns a SIP 200 OK message to the SIP/IP core network, to acknowledge receipt of the request.

204. The SIP/IP core network forwards the SIP 200 OK message to the client B.

205. The IM server B authenticates the subscription request, examining the subscribed event, Expires and whether the subscriber has the corresponding permission, judging whether to allow the client B subscribing the notification when the event happens and if the IM server B gets authenticated (the detailed authentication is not within the range of the present invention and will not be described here), performing step 206.

206. The IM server B sends a first SIP NOTIFY message to the SIP/IP core network. The first SIP NOTIFY message includes current status information, i.e. the deferred message status and the deferred message notification for the client B. If the client B doesn't have a deferred message, the body of the SIP NOTIFY message is empty.

207. The SIP/IP core network forwards the SIP NOTIFY message to the client B and when the client B receives the first SIP NOTIFY message, the subscription is processed successfully.

208. The client B returns a SIP 200 OK message to the SIP/IP core network.

209. The SIP/IP core network forwards the SIP 200 OK message to the IM server B.

Thus, the subscription/notification process ends.

Assuming the user B gets off line after a period and then gets online again, when the IM server B detects the user B gets online and finds he has a deferred message and has subscribed the deferred message notification, it will perform the following steps.

210. The IM server B sends a first SIP NOTIFY message to the SIP/IP core network. The first SIP NOTIFY message includes a current deferred message notification.

211. The SIP/IP core network forwards the SIP NOTIFY message to the client B.

212. The client B returns a SIP 200 OK message to the SIP/IP core network, to acknowledge receipt of the notification 213. The SIP/IP core network forwards the SIP 200 OK message to the IM server B.

In the above steps, step 205 can be performed immediately after step 203 and has no time sequence with step 204.

Figure 3:
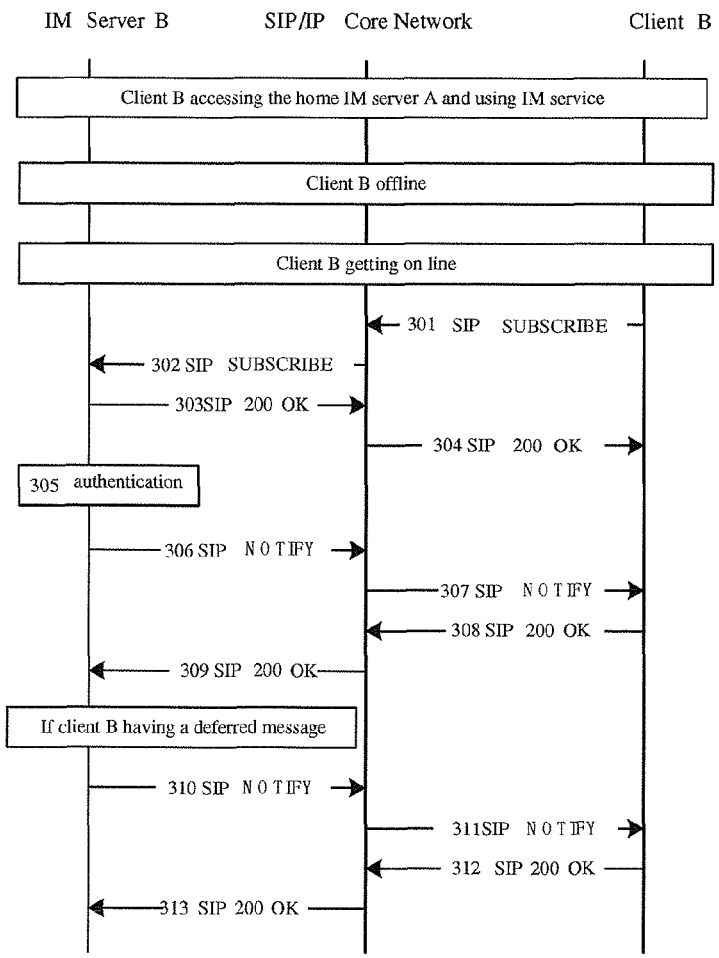
FIG. 3 is a signaling flow chart showing the process that a client of a user receiving the deferred message requests to subscribe a deferred message notification from a server temporarily after getting online, and a notification issues according to an embodiment of the present invention.

When the user needs to subscribe the deferred message notification temporarily, the IM client of the user gets online and sends the deferred message subscription request to the IM server. If the subscription succeeds, and if there is a deferred message, the IM server will issue the deferred message notification. In this case, the notification to the client is only sent once. The specific flow is shown in FIG. 3 and includes the following steps.

301. The client of the receiving user sends a SIP SUBSCRIBE request to the SIP/IP core network to subscribe the deferred message notification. The SIP URI address of the IM server B is put in the Request URI to show it's going to subscribe the event of the IM server B. The time of retrieving the update information notification can be defined in a header of the event package of the message such as defining the deferred message notification only to be retrieved this time. The notification content may be specified in the message event package such as including the deferred message list and the deferred message meta-data or including the deferred message content. The feature code of the SIP/SIMPLE IM service may be included in the Accept-Contact (name of a standard field in the SIP message header) of the message such as the "+g.oma.sip-im";

302. The SIP/IP core network judges the subscription request is for the IM server B according to the URI address and forwards the SIP SUBSCRIBE request to the IM server B;

303. After receiving the SIP SUBSCRIBE request, the IM server B returns a SIP 200 OK message to the SIP/IP core network, to acknowledge receipt of the request.

304. The SIP/IP core network forwards the SIP 200 OK message to the client B.

305. The IM server B authenticates the subscription request, examining the subscribed event, Expires and whether the subscriber has the corresponding permission, judging whether to allow the client B subscribing the notification when the event happens and if the IM server B gets authenticated, performing step 306.

306. The IM server B sends a first SIP NOTIFY message to the SIP/IP core network and the first SIP NOTIFY message includes the current status information, i.e. the deferred message status and the deferred message notification for the client B. If the client B doesn't have a deferred message, the body of the SIP NOTIFY message is empty.

307. The SIP/IP core network forwards the SIP NOTIFY message to the client B and when the client B receives the first SIP NOTIFY message, the subscription is processed successfully.

308. The client B returns a SIP 200 OK message to the SIP/IP core network.

309. The SIP/IP core network forwards the SIP 200 OK message to the IM server B. If the IM server B has a deferred message, perform the following step.

310. The IM server B sends a first SIP NOTIFY message to the SIP/IP core network and the SIP NOTIFY message includes a current deferred message notification.

311. The SIP/IP core network forwards the SIP NOTIFY message to the client B.

312. The client B returns the SIP 200 OK message to the SIP/IP core network, to acknowledge receipt of the notification.

313. The SIP/IP core network forwards the SIP 200 OK message to the IM server B.

Similarly, in the above steps, step 305 can be performed immediately after step 303 and has no time sequence with step 304.

The user may not have subscribed the deferred message notification event and in this case whether to provide the user with the deferred message notification function depends on the setting of the operator. For example, if the server is configured to provide the function as default, even if the user hasn't subscribed the deferred message notification, the deferred message notification will be sent to the user after he gets online; if providing the function is not default, the user has to subscribe before the deferred message notification is sent. Whether the notification content is the message list and the meta-data or the deferred message content will be issued directly depends on the setting and operation of the server.

The deferred message includes the meta-data and the content, which can be stored in the same deferred message storage entity or stored independently, i.e. the meta-data is stored in the IM XDMS and the content is stored in the deferred message storage entity.

Figure 4:
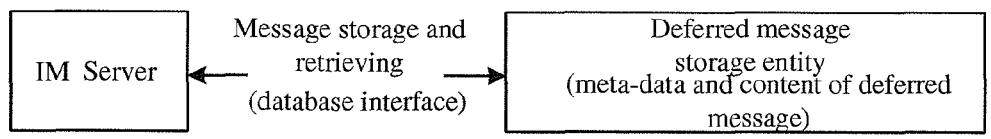
FIG. 4 is a schematic diagram showing meta-data and a content of the deferred message are combined and stored according to an embodiment of the present invention.

FIG. 4 shows the combination and storage of the deferred message data. The deferred message meta-data and the deferred message content are stored in the same deferred message storage entity and the IM server only needs to reach one deferred message storage entity before retrieving the deferred message data. The interface between the IM server and the deferred message storage entity may be a database interface.

Figure 5:
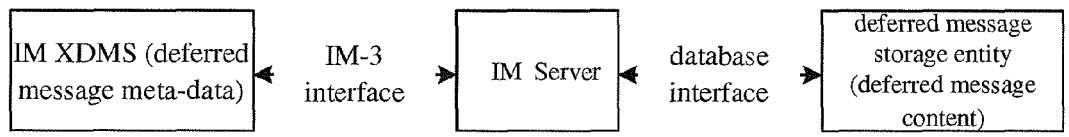
FIG. 5 is a schematic diagram showing meta-data and a content of the deferred message are stored independently according to an embodiment of the present invention.

FIG. 5 shows the case of storing the deferred message data independently. The meta-data is stored in the IM XDMS and the content is stored in the deferred message storage entity. The interface between the IM server and the deferred message storage entity may be a database interface; the interface between the IM server and the IM XDMS is an IM-3 interface defined by OMA and the carrying protocol is XCAP, which can support the management function of the XML document (such as the deferred message meta-data) stored in the IM XDMS through the IM-3 interface, such as the build, modification, obtainment and delete.

When the receiving user gets online, the IM server determines whether to issue the deferred message according to whether the user has subscribed the deferred message notification and to the subscription setting. When the IM server issues the deferred message, it will obtain the meta-data of the message from the deferred message storage entity and then issue it. In different storage technologies, the notification flows will be different.

In addition, if the user has subscribed the deferred message notification, the carrying message is the SIP NOTIFY; if the user hasn't subscribed, the server defaults to issue the notification and the carrying message is the SIP MESSAGE.

There are four cases of the deferred message notification process according to the different methods for storing messages and different methods for carrying the deferred message notification.

Figure 6:
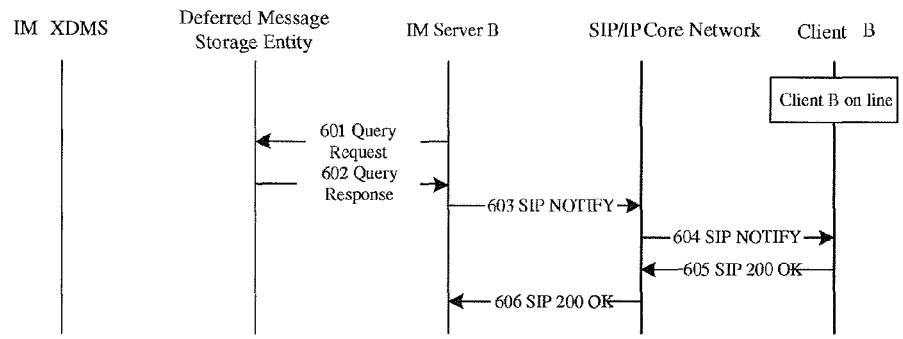
FIG. 6 is a signaling flow chart showing the process of notifying of deferred messages when meta-data and a content of the deferred message are combined and stored and a user has subscribed a deferred message notification according to an embodiment of the present invention.

Case one: FIG. 6 shows the notification flow of the deferred message when a meta-data and a content of the deferred message are combined and stored and a user has subscribed a deferred message notification.

601. When the IM server B detects the client B of the receiving user gets online, it decides to issue the deferred message notification to the client B and queries the deferred message meta-data content on the deferred message storage entity, wherein the query request may be done through the database interface provided by the database (such as Oracle and DB2) of the storage logic entity.

602. The deferred message storage entity returns a query result to the IM server B through the database interface.

603. The IM server B constructs a SIP NOTIFY message according to the returned query result and sends the message to the SIP/IP core network, wherein the SIP NOTIFY message carries the deferred message list and deferred message meta-data such as "UserB, you have X number of Ims, mainly informationre listed as:************".

604. The SIP/IP core network forwards the SIP NOTIFY message to the client B.

605. The client B returns a SIP 200 OK message to the SIP/IP core network, to acknowledge receipt of the SIP NOTIFY message.

606. The SIP/IP core network forwards the SIP 200 OK message to the IM server B.

Figure 7:
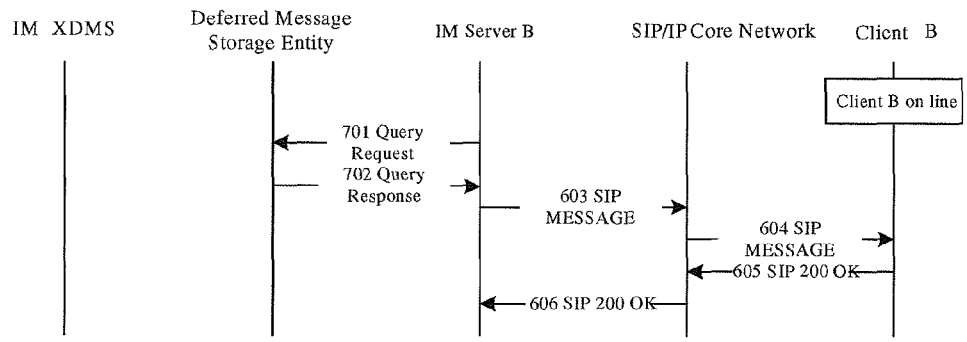
FIG. 7 is a signaling flow chart showing the process of notifying of deferred messages when meta-data and a content of the deferred message are combined and stored and a user hasn't subscribed a deferred message notification according to an embodiment of the present invention.

Case two: FIG. 7 shows when a meta-data and a content of the deferred message are combined and stored and a user hasn't subscribed a deferred message notification but the IM server defaults to issue the deferred message notification, the notification flow is similar with that in FIG. 6 and the differences are described as follows.

In step 703, the IM server B sends a SIP MESSAGE, which means to issue the deferred message notification, to the SIP/IP core network, wherein the SIP URI address of the client B is specified in the Request URI and the feature code of the SIP/SIMPLE IM service is included in the "Accept-Contact" of the message such as the "+g.oma.sip-im". The deferred message list and meta-data are carried in the message body such as the "UserB, you have X number of IMs, mainly informationre listed as:***********".

In step 704, the SIP/IP core network forwards the SIP MESSAGE message to the client B according to the SIP URI address included in the message.

Figure 8:
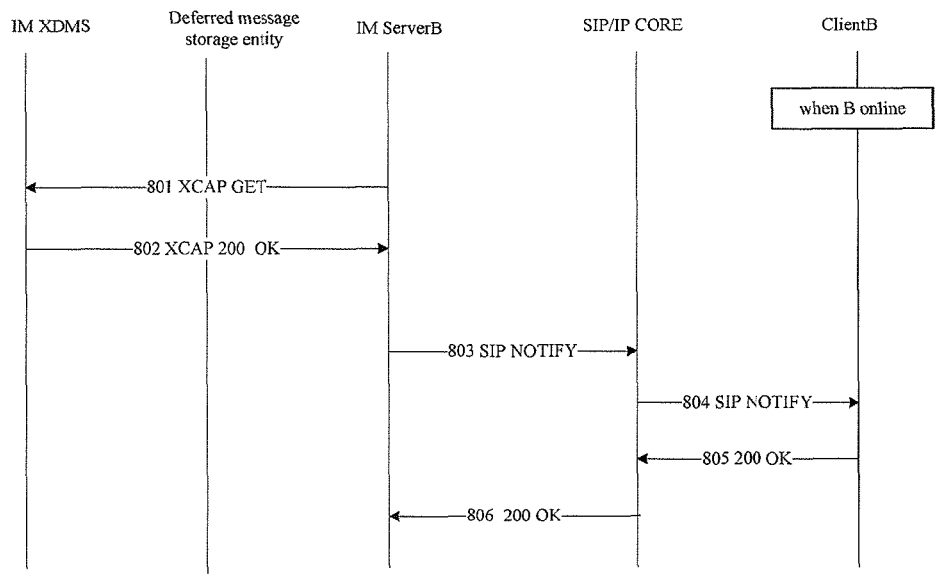
FIG. 8 is a signaling flow chart showing the process of notifying of deferred messages when meta-data and a content of the deferred message are stored independently and a user has subscribed a deferred message notification according to an embodiment of the present invention.

Case three: FIG. 8 shows the notification flow of the deferred message when a meta-data and a content of the deferred message are stored independently and a user has subscribed a deferred message notification.

801. When the IM server B detects the client B of the receiving user gets online, it decides to issue the deferred message notification to the client B and issues an XCAP GET request to the IM XDMS for the deferred message meta-data of the client B, wherein request URI in the XCAP GET request is set to be the URI of the deferred message meta-data XML document.

802. The IM XDMS queries the related deferred message meta-data and if the query is successful, an XCAP 200 OK response is returned to the IM server B and the query result is included in the XCAP 200 OK response.

803. The IM server B transforms the XCAP 200 OK message into a SIP NOTIFY message and sends it to the SIP/IP core network, wherein the SIP NOTIFY message carries the deferred message list and the meta-data such as the "UserB, you have X number of IMs, mainly informationre listed as:***********".

804. The SIP/IP core network forwards the SIP NOTIFY message to the client B.

805. The client B returns a SIP 200 OK message to the SIP/IP core network, to acknowledge receipt of the SIP NOTIFY message.

806. The SIP/IP core network forwards the SIP 200 OK message to the IM server B.

Figure 9:
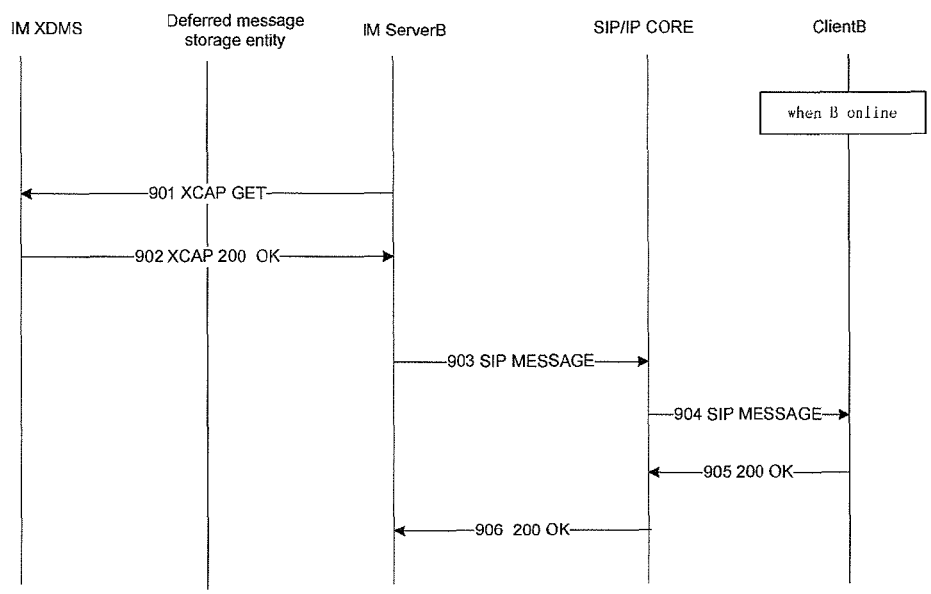
FIG. 9 is a signaling flow chart showing the process of notifying of deferred messages when meta-data and a content of the deferred message are stored independently and a user hasn't subscribed a deferred message notification according to an embodiment of the present invention.

Case four: FIG. 9 shows when a meta-data and a content of the deferred message are stored independently and a user hasn't subscribed a deferred message notification but the IM server defaults to issue the deferred message notification, the notification flow is similar with that in FIG. 8 and the differences are as follows.

In step 903, the IM server B sends a SIP MESSAGE, which means to issue the deferred message notification, to the SIP/IP core network, wherein the SIP URI address of the client B is specified in the Request URI and the feature code of the SIP/SIMPLE IM service is included in the "Accept-Contact" of the message such as the "+g.oma.sip-im". The deferred message list and meta-data are carried in the message body such as the "UserB, you have X number of IMs, mainly informationre listed as:***********".

In step 704, the SIP/IP core network forwards the SIP MESSAGE message to the client B according to the SIP URI address included in the message.

When the client of the receiving user receives the deferred message notification, the user may choose to obtain some message contents according to some strategy and then the client may send a retrieving request to the IM server for the specific message content chosen at the interface of the terminal.

The retrieving strategy may include retrieving some messages randomly, retrieving the message according to the sender, the sending time, the size of the message or the combination of the above.

The carrying protocol of the retrieving request may be the SIP, or the MSRP or the HTTP etc.

When the IM server receives the retrieving request from the client, it needs to read the content of the chosen deferred message from the deferred message storage entity and then issues it to the client. The carrying protocol of the message issuing interface may be the SIP, or the MSRP or the HTTP etc.

There are two manners for issuing the message.

Manner one: the messages are issued one by one, i.e. the IM server can only issue one deferred message content once.

Figure 10:
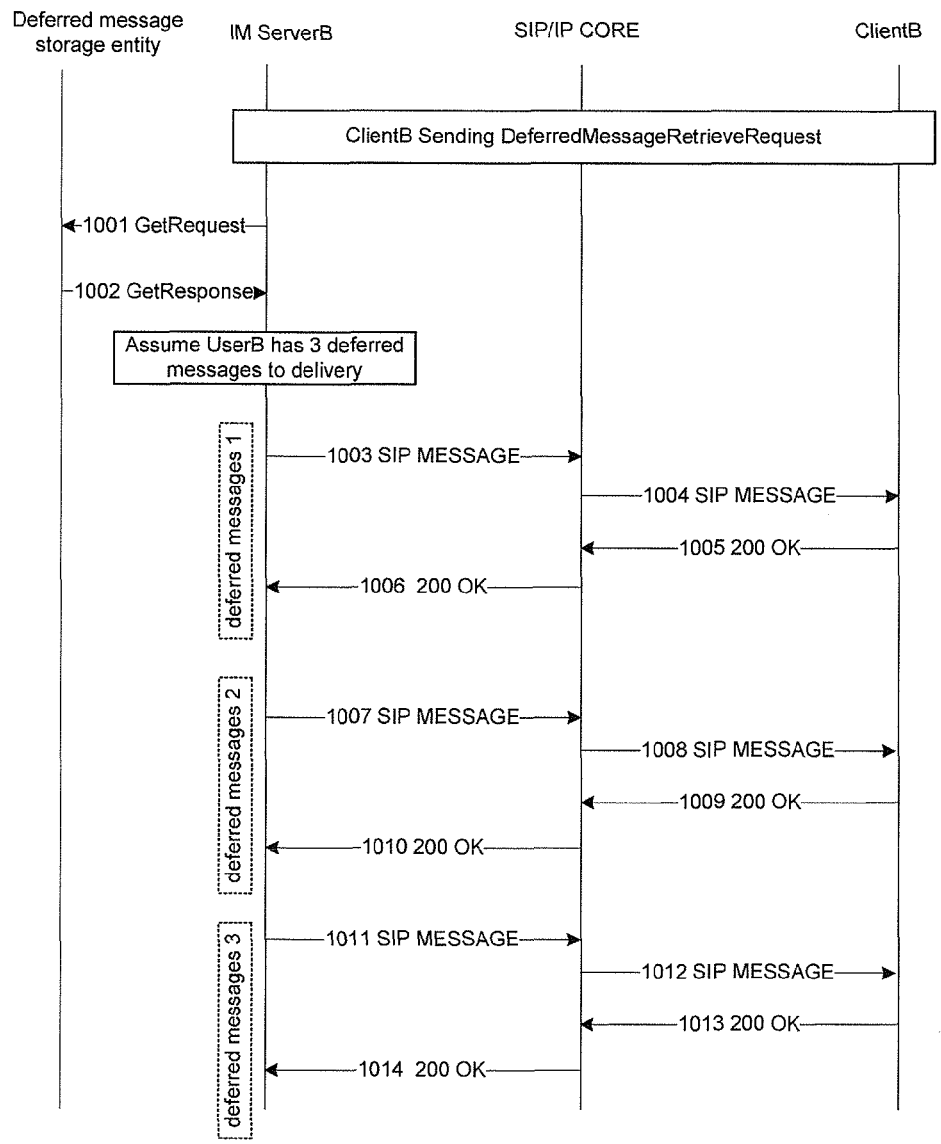
FIG. 10 is a signaling flow chart showing the IM server issues the deferred messages piece by piece according to an embodiment of the present invention.

The flow is described with reference to the carrier of SIM MESSAGE. FIG. 10 shows the IM server issues the deferred messages one by one.

1001. When the IM server B detects the client B of the receiving user gets online, it queries the deferred message content on the deferred message storage entity according to the retrieving strategy in the query request, wherein the query request may be done through the database interface provided by the database (such as Oracle and DB2) of the storage logic entity.

1002. The deferred message storage entity returns the query result to the IM server B through the database interface, supposing the user B has three deferred messages.

1003. The IM server B sends the SIP MESSAGE, which means to issue the content of the first deferred message, to the SIP/IP core network, wherein the SIP URI address of the client B is appointed in the Request URI and the feature code of the SIP/SIMPLE IM service is included in the "Accept-Contact" of the message such as the "+g.oma.sip-im"; the content of the first deferred message is carried in the message body.

1004. The SIP/IP core network forwards the SIP MESSAGE message to the client B according to the SIP URI address included in the message.

1005. The client B returns the SIP 200 OK message to the SIP/IP core network, to acknowledge receipt of the SIP MESSAGE message.

1006. The SIP/IP core network forwards the SIP 200 OK message to the IM server B.

1007. The IM server B sends the SIP MESSAGE, which means to issue the content of the second deferred message, to the SIP/IP core network, wherein the SIP URI address of the client B is appointed in the Request URI and the feature code of the SIP/SIMPLE IM service is included in the "Accept-Contact" of the message such as the "+g.oma.sip-im"; the content of the second deferred message is carried in the message body.

1008. The SIP/IP core network forwards the SIP MESSAGE message to the client B according to the SIP URI address included in the message.

1009. The client B returns the SIP 200 OK message to the SIP/IP core network, to acknowledge receipt of the SIP MESSAGE message.

1010. The SIP/IP core network forwards the SIP 200 OK message to the IM server B.

1011. The IM server B sends the SIP MESSAGE, which means to issue the content of the third deferred message, to the SIP/IP core network, wherein the SIP URI address of the client B is appointed in the Request URI and the feature code of the SIP/SIMPLE IM service is included in the "Accept-Contact" of the message such as the "+g.oma.sip-im"; the content of the third deferred message is carried in the message body.

1012. The SIP/IP core network forwards the SIP MESSAGE message to the client B according to the SIP URI address included in the message.

1013. The client B returns the SIP 200 OK message to the SIP/IP core network, to acknowledge receipt of the SIP MESSAGE message.

1014. The SIP/IP core network forwards the SIP 200 OK message to the IM server B.

Step 1007 is unnecessary to be after step 1006 and it can be performed after step 1003. Step 1011 is unnecessary to be after step 1010 and it can be after step 1003.

Manner two: the messages are issued at one time, i.e. the IM server can issue a plurality of deferred message contents at one time.

Figure 11:
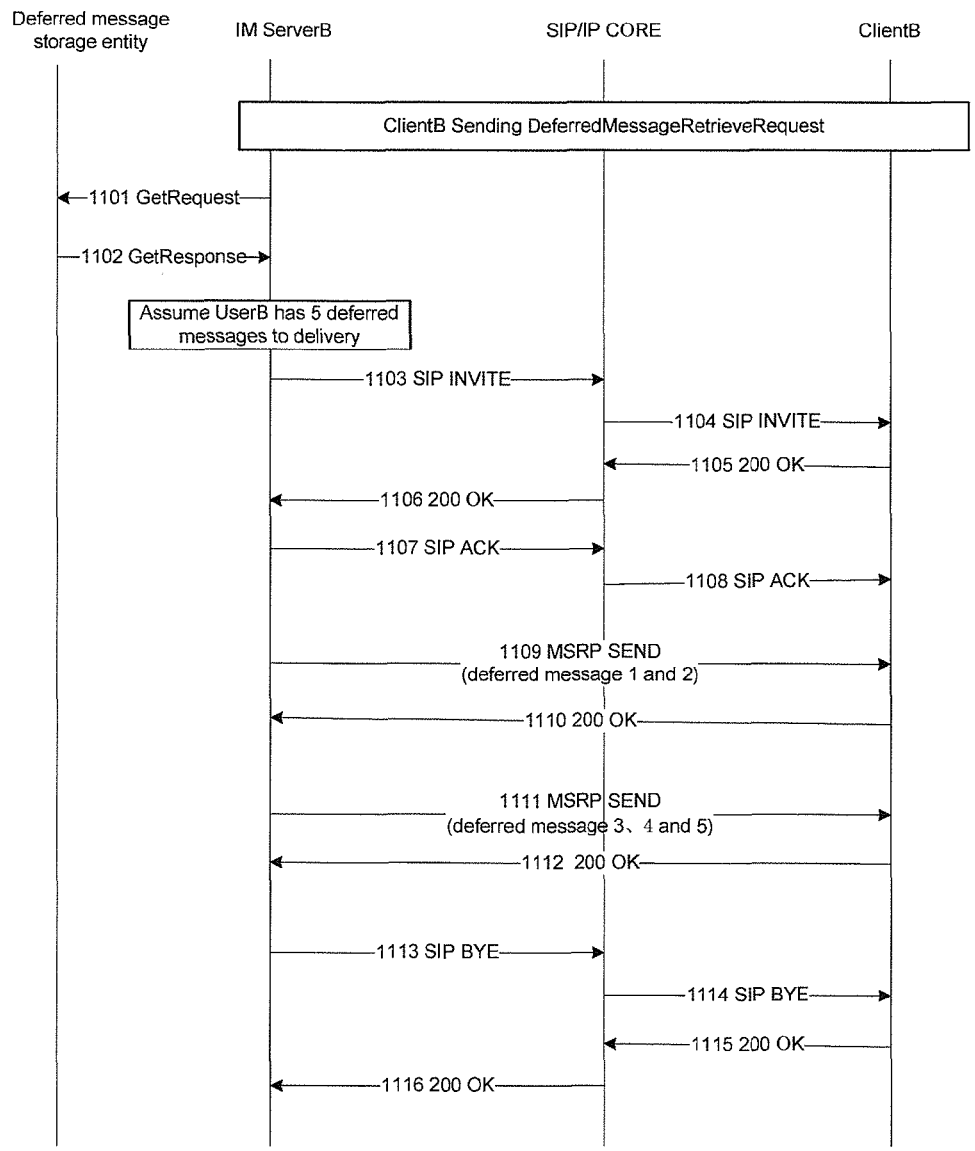
FIG. 11 is a signaling flow chart showing the IM server combines several pieces of deferred messages and issues them at one time according to an embodiment of the present invention.

The flow is described with reference to the carrier of MSRP. FIG. 11 shows the IM server issues a plurality of deferred message contents at one time.

1101. When the IM server B detects the client B of the receiving user gets online, it queries the deferred message content on the deferred message storage entity according to the retrieving strategy in the query request, wherein the query request may be done through the database interface provided by the database (such as Oracle and DB2) of the storage logic entity.

1102. The deferred message storage entity returns the query result to the IM server B through the database interface, supposing the user B has five deferred messages.

1103. The IM server B sends a SIP INVITE message to the SIP/IP core network for establishing an MSRP channel to the client B so as to send the stored deferred messages to the client B.

1104. The SIP/IP core network forwards the SIP INVITE message to the client B.

1105. The client B returns a SIP 200 OK message to the SIP/IP core network, to acknowledge receipt of the SIP INVITE message.

1106. The SIP/IP core network forwards the SIP 200 OK message to the IM server B.

1107. The IM server B acknowledges receipt of the SIP 200 OK message and sends a SIP ACK message to the SIP/IP core network.

1108. The SIP/IP core network forwards the SIP ACK message to the IM server B.

Thus, the MSRP channel is established.

1109. The IM server B sends an MSRP SEND message to the client B through the MSRP channel, wherein the MSRP SEND message carries the contents of the deferred messages 1 and 2 so that the deferred messages 1 and 2 are combined to be sent.

1110. The client B sends a MSRP 200 OK message to the IM server B, to acknowledge the client has received the message.

1111. The IM server B sends an MSRP SEND message to the client B through the MSRP channel, wherein the MSRP SEND message carries the contents of the deferred messages 3, 4 and 5 so that the deferred messages 3, 4 and 5 are combined and sent.

1112. The client B sends a MSRP 200 OK message to the IM server B, to acknowledge the client has received the message.

1113. The IM server B sends a SIP BYE message to the SIP/IP core network, requesting for disconnecting the MSRP channel and ending the session.

1114. The SIP/IP core network forwards the message to the client B.

1115. The client B sends a SIP 200 OK message to the SIP/IP core network after receiving the SIP BYE message and the MSRP channel is disconnected between the IM server B and the client B.

1116. The SIP/IP core network forwards the message to the IM server B and the IM server B acquires the MSRP channel is disconnected between the IM server B and the client B.

In the flow described in FIG. 11, the IM server first reads the deferred message content and then establishes the MSRP channel to the client. Another method is to first establish the MSRP channel to the client and then read the deferred message content. The flow described in FIG. 12 is similar with that in FIG. 11 and the difference is that after the MSRP channel is established between the IM server B and the client B, the chosen deferred message content is retrieved from the deferred message storage entity and then sent to the client B.

Figure 12:
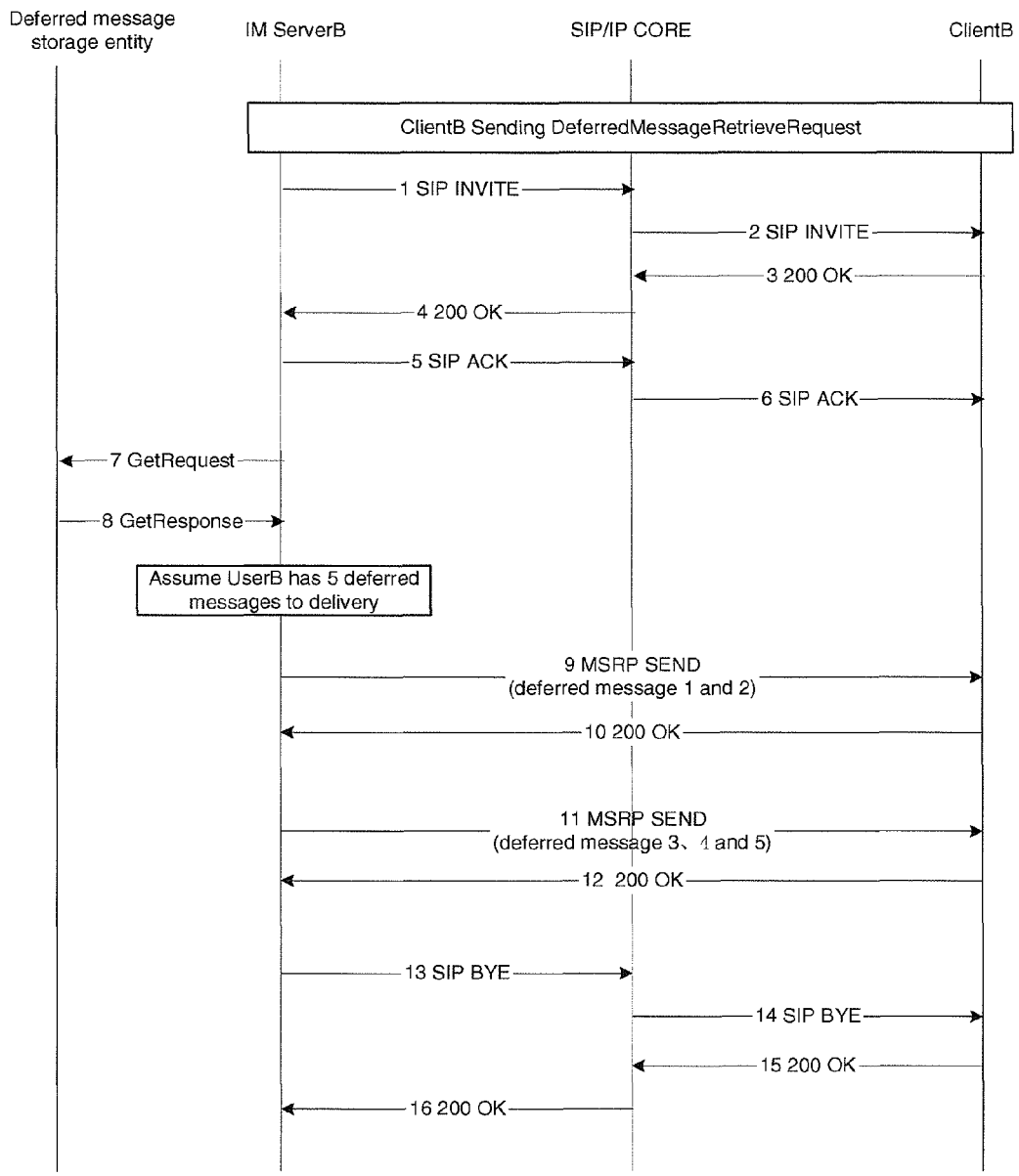
FIG. 12 is a signaling flow chart showing the IM server combines several pieces of deferred messages and issues them at one time according to another embodiment of the present invention.

In the flows described in FIG. 11 and FIG. 12, the IM server determines the number of the deferred messages which can be carried at one time according to the preset of the receiving user B or of the IM system, of the client B's service ability and/or amount of information can be carried by the current MSRP SEND message and sends the deferred messages in the same MSRP SEND message. The deferred messages in the MSRP SEND message are separated with each other so as to be differentiated. It has to be ensured that the sum of the content of the deferred messages is less than the maximum capacity supported by the carrying message. For example, if the deferred messages are issued in the SIP MESSAGE, since the length of the message body is at most 1300 bytes, the sum of the content of the deferred messages cannot exceed 1300 bytes.

If the deferred messages are issued in the MSRP SEND message, in order to guarantee the transmission efficiency, the length of the MSRP message body is at most 2048 bytes. In addition, since the MSRP protocol has the function of combining a plurality of messages, if the message is large, it can be sent in several SEND requests and every SEND request include a part. The above is the transmission mechanism of the MSRP and the IM server doesn't need to perform extra process.

Although illustrative embodiments have been described herein with reference to the accompanying drawings, it should be understood by those skilled in the art that the present invention is not limited to those preferred embodiments, and that various changes and modifications can be made therein without departing from the spirit and the scope of the invention. Thus, it is intended that the present invention covers the modifications and variations of this invention provided they come within the scope of the appended claims and their equivalents.

What is claimed is:

1. A method for processing deferred messages, applicable in an instant message (IM) system under Session Initiated Protocol (SIP) and Instant Message and Presence Leveraging Extensions (SIMPLE), said method comprising storing the deferred messages, notifying of the deferred messages and retrieving the deferred messages, wherein said storing the deferred messages comprises storing, by the IM system, the deferred messages to be sent to a user in a case that the user pre-requests for storing the deferred messages; where the deferred messages comprise meta-data and content, the meta-data is stored in an IM Extensible Markup Language Document Management Server entity (IM XDMS entity) and the content is stored in a deferred message content storage entity;

said notifying of the deferred messages comprises determining there are deferred messages for the user stored in the IM system associated with a client of the user when the user gets online, and sending a deferred message notification to the client of the user; and said retrieving the deferred messages comprises sending the deferred messages to the client by the IM server in response to a request from the client for retrieving the deferred messages after the client receives the deferred message notification.

2. The method according to claim 1, wherein the deferred message notification content comprises deferred message list information and the meta-data.

3. The method according to claim 1, wherein if the user subscribes the deferred message notification, the deferred message notification is sent in a SIP NOTIFY message; otherwise, the deferred message notification is sent in a SIP MESSAGE under default setting of the IM system.

4. The method according to claim 3, wherein sending the deferred message notification comprises: sending, by the IM system, the deferred message notification at a set time or periodically or once only after the client gets online.

5. The method according to claim 1, wherein the deferred message notification comprises deferred message list information and deferred message meta-data or a deferred message content.

6. The method according to claim 1, wherein if the user subscribes the deferred message notification, when the client gets online, the IM server queries and retrieves the deferred message meta-data for the user from the IM XDMS entity through an IM-3 interface; and then the IM server constructs a deferred message list in accordance with a query result and sends the deferred message notification to the client of the server by a SIP NOTIFY message carrying the deferred message list and the deferred message meta-data.

7. The method according to claim 1, wherein if the user does not subscribe the deferred message notification, when the client gets online, the deferred message meta-data for the user is retrieved from the IM XDMS entity through an IM-3 interface; and then a deferred message list in accordance with a query result is constructed and the deferred message notification is sent to the client of the server carrying the deferred message list and the deferred message meta-data.

8. An instant message (IM) server for processing deferred messages, applicable under Session Initiated Protocol (SIP) and Instant Message and Presence Leveraging Extensions (SIMPLE), said IM server comprising a storage entity configured to store the deferred messages, a notification entity configured to notify the deferred messages and a retrieving entity configured to retrieve the deferred messages, wherein the storage entity configured to store the deferred messages to be sent to a user in a case that the user pre-requests for storing the deferred messages; where the deferred messages comprise meta-data and content, and the meta-data and content are stored separately in different storage entities in the step of storing the deferred messages, the meta-data is stored in an IM Extensible Markup Language Document Management Server entity (IM XDMS entity) and the content is stored in a deferred message content storage entity;

the notification entity configured to determine there are deferred messages for the user stored in the IM server associated with a client of the user when the user gets online, and sending a deferred message notification to the client of the user; and the retrieving entity configured to send the deferred messages to the client by the IM server in response to a request from the client for retrieving the deferred messages after the client receives the deferred message notification.

\* \* \* \* \*